Dec. 7, 1965   M. H. GROVE   3,222,028
VALVE CONSTRUCTION
Filed March 4, 1963
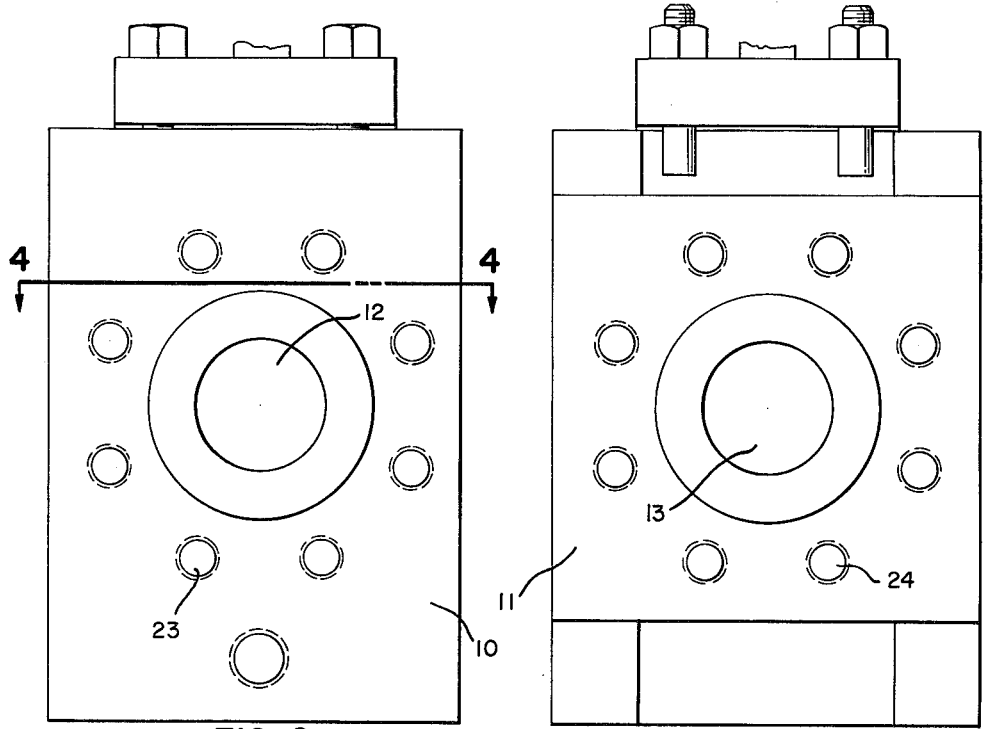
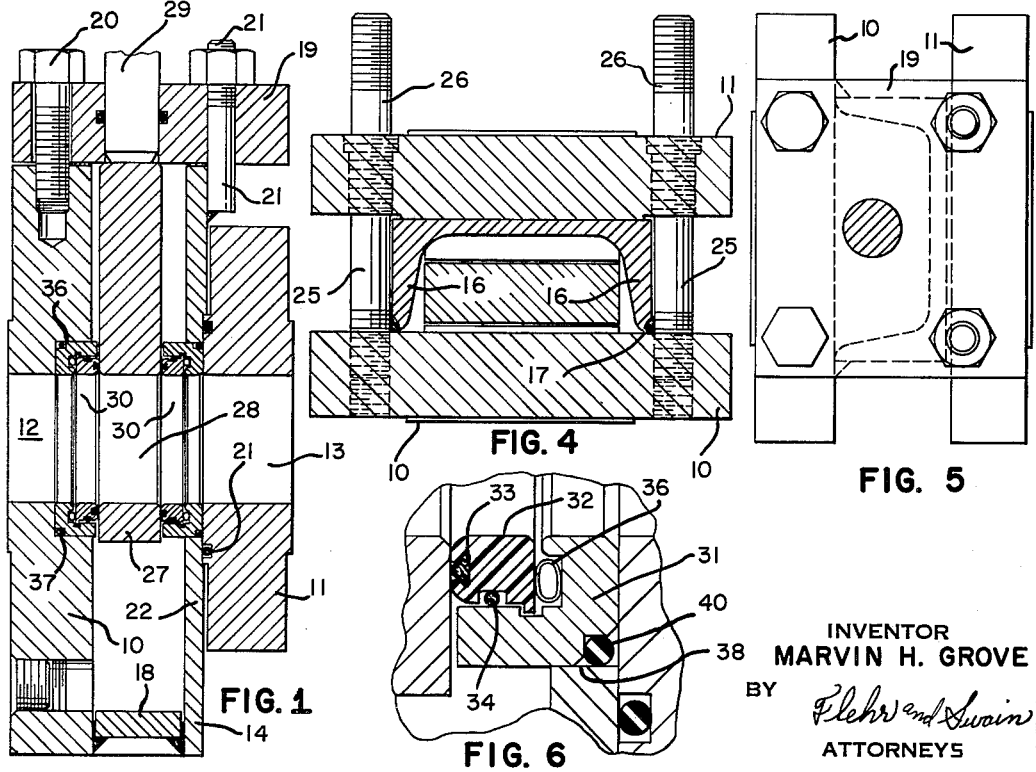
INVENTOR
MARVIN H. GROVE
BY
Flehr and Swain
ATTORNEYS

United States Patent Office 3,222,028
Patented Dec. 7, 1965

3,222,028
VALVE CONSTRUCTION
Marvin H. Grove, 340 Hillside Ave., Piedmont, Calif.
Filed Mar. 4, 1963, Ser. No. 262,738
1 Claim. (Cl. 251—327)

This invention relates generally to valves of the gate type.

Conventional gate valves are made with bodies formed of cast metal, such as cast iron or cast steel. Generally with such valves the hubs are cast integral with the body. More recently valve bodies have been constructed by assembling component parts, all or a major portion being mill-rolled structural steel. Such fabricated valves have been particularly successful when made in the larger sizes, largely because of savings in weight which make for reduced manufacturing costs. However, comparable savings have not been possible for fabricated valves made in the smaller sizes. This is due largely to the constructions which have been employed, which require extensive welding or bolting operations and machining, compared to the present invention.

In general it is an object of the present invention to provide a simple fabricated gate valve construction which is relatively economical to manufacture in the small or medium sizes.

Another object is to provide a valve construction of the above character which is well adapted for valves capable of operating on relatively high line pressures, as for example pressures in excess of 200 p.s.i.

Another object is to provide a valve construction of the above character which is economical with respect to the machining and welding operations required.

Additional objects and features of the invention will appear from the following description of which the preferred embodiment has been set forth in detail in conjunction with the accompanying drawing.

Referring to the drawing:

FIGURE 1 is a side elevation in section illustrating a valve incorporating the present invention.

FIGURE 2 is an end view of the valve shown in FIGURE 1, looking toward the left-hand end of FIGURE 1.

FIGURE 3 is an end view looking toward the right-hand end of FIGURE 1.

FIGURE 4 is a cross section taken along the line 4—4 of FIGURE 2.

FIGURE 5 is a plan view of the valve, with the valve operating rod shown in section.

FIGURE 6 is an enlarged detail showing a suitable sealing assembly.

The valve illustrated in the drawing consists of the relatively heavy rigid end members 10 and 11, which have aligned openings 12 and 13 forming flow passages. Between the members 10 and 11 there is a structural mill-rolled channel 14, which may be of suitable steel or steel alloy. As shown particularly in FIGURE 4, the flanges 16 of the channel form the side walls of the body. The edges of the flanges 16 are secured by welds 17 to the adjacent face of member 10. As shown in FIGURE 2, member 10 may be rectangular with a length corresponding to that of the channel and a width somewhat greater than that of the channel.

One end of the body is closed by the plate 18, which is secured to the channel and to the member 10 by welding. The other end of the body is closed by the bonnet plate 19. This plate is held in place by the studs 20, which are threaded into the adjacent end portion of member 10, and by the stud bolts 21, which are attached by welding to the web 22 of the channel.

Member 11 may be substantially rectangular or square, and of a width corresponding to the width of the member 10. It is sealed with respect to the adjacent face of the channel web 22 by suitable means such as the seal ring 21 of the resilient O-ring type.

Member 10 is provided with a series of threaded openings 23, distributed about a bolting circle, and member 11 has a similar series of threaded openings 24. The holes that are located beyond the sides of the channel are provided with clamping bolts 25, which serve to clamp the members 10 and 11 toward each other and against the intervening channel. The studs 26 formed by the extended ends of these bolts serve as studs for engaging the coupling flange of associated piping. The remaining holes 23 and 24 can be engaged by the studs or stud bolts of pipe coupling flanges. Within the valve body there is a flat plate-like gate 27, which is shown provided with a port 28 adapted to register with the flow passages 12 and 13 for open position of the valve. As viewed in FIGURE 1, the gate is positioned to one side of the body space, thus permitting it to properly clear the fillets between the flanges and the web of the channel. One end of the gate is shown attached to the operating rod or stem 29.

The valve is also provided with annular sealing assemblies 30. One suitable type of assembly is illustrated in FIGURE 6. It consists of a metal mounting ring 31 that is recessed to accommodate the annular sealing ring 32 made of resilient material such as nylon, together with a resilient insert 33 of suitable material, such as synthetic rubber. The seal ring 32 is shown sealed with respect to the mounting ring 32 by sealing means 34 of the O-ring type. Also the ring 32 is urged against the gate by suitable means such as a coiled wire spring 36, which has its convolutions inclined.

On that side of the valve body formed by the plate 10, the inner side of the plate is machined to provide the recess 36, within which one of the assemblies is seated. A seal is established between the mounting ring 31 and the adjacent peripheral surface of the recess, by the seals 37 of the O-ring type.

On the other side of the body, the sealing assembly is accommodated within an opening 38 formed in the web 22 of the channel. Here again a seal is established by means of the seal ring 40 of the O-ring type.

It will be evident that the valve described above is relatively simple in its construction. The welding operations required are relatively simple, and a minimum amount of machining is required. When assembled a relatively strong body is formed which is capable of resisting relatively high line pressures.

I claim:

In a gate valve construction, a plate-like member having an opening therein forming a flow passage, a section of a structural steel channel positioned adjacent one side of said plate-like member, the edges of the flanges of said channel being welded to said plate-like member, the web of the channel having an opening therein in alignment with the openings in the plate-like member, a closure welded to one end of the channel and to the adjacent portion of said plate-like member, a bonnet plate secured to the other end of the channel and to the adjacent extremity of said plate-like member, a movable gate disposed within the channel, said gate being spaced from the web of the channel a distance substantially greater than its spacing from the plate-like member, an operating stem extending through the bonnet plate and connected to said gate, a second member positioned against the exterior surface of the web of the channel, said second member having an opening therein in alignment with said first named opening and forming a flow passage, means forming a seal between said second member and the web of the channel, clamping means extending between said members and serving to clamp the same against the channel, a pair of annular sealing assemblies interposed between the sides of the gate and the body, one of said sealing assemblies being accommodated in an annular recess formed in the said one plate-like member, and the other sealing assembly being accommodated within an opening formed in the web of the channel, both said members being adapted for making connections with associated piping.

References Cited by the Examiner

UNITED STATES PATENTS

| | | | |
|---|---|---|---|
| 2,820,479 | 1/1958 | Jenkins | 251—326 X |
| 2,857,129 | 10/1958 | Overholser et al. | 251—328 X |
| 2,904,306 | 9/1959 | Bryant | 251—329 X |
| 2,982,514 | 5/1961 | Bryant | 251—329 |

FOREIGN PATENTS 471,417  9/1937  Great Britain

M. CARY NELSON, *Primary Examiner.*